United States Patent [19]

Herron

[11] Patent Number: 5,060,459
[45] Date of Patent: Oct. 29, 1991

[54] HAY CONDITIONING UNIT

[76] Inventor: Harold S. Herron, Rte. 5, Box 177, Live Oak, Fla. 32060

[21] Appl. No.: 615,870

[22] Filed: Nov. 20, 1990

[51] Int. Cl.⁵ ..................... A01D 78/14; A01D 84/00
[52] U.S. Cl. ..................................... 56/10.2; 56/14.7; 56/16.4; 56/DIG. 15; 56/DIG. 23
[58] Field of Search .................. 56/1, 10.2, 10.1, 16.4, 56/14.7, 10.4, DIG. 15, DIG. 23

[56] References Cited

U.S. PATENT DOCUMENTS

| | | | |
|---|---|---|---|
| 2,698,170 | 12/1954 | Foley | 56/16.4 X |
| 2,756,554 | 7/1956 | Diehl et al. | 56/16.4 X |
| 2,806,337 | 9/1957 | Rezabek | 56/1 |
| 3,512,765 | 5/1970 | van der Lely | 56/16.4 X |
| 4,254,605 | 3/1981 | Maher | 56/14.4 |
| 4,604,857 | 8/1986 | Maher | 56/16.4 |
| 4,850,183 | 7/1989 | Fox | 56/16.4 |

Primary Examiner—Stephen J. Novosad
Attorney, Agent, or Firm—Terry M. Gernstein

[57] ABSTRACT

A hay conditioning unit includes drier units which utilize microwave energy to dry hay as that hay moves through a housing on a conveyor belt. Various temperature and moisture sensors are located along the path of the hay to sense the temperature and moisture of the hay so that hay can be discharged from the unit to have a precisely controlled moisture and protein level. Other controls are included to permit such state conditions to be controlled in a desired manner, and further controls are included to permit manually overriding the automatic process controls.

10 Claims, 3 Drawing Sheets

HAY CONDITIONING UNIT

TECHNICAL FIELD OF THE INVENTION

The present invention relates to the general art of agricultural implements, and to the particular field of hay conditioners.

BACKGROUND OF THE INVENTION

After mowing of a standing crop, it has usually been the practice to leave the windrow for two or three days to cure in the sun and wind before picking it up progressively by means of a hay baler having a forwardly-mounted pick-up in the form of a rake. The windrow material to be so cured is left on the ground until it has the dry appearance which results after having had its moisture content reduced to approximately 17% by weight.

The hay baler feeds the material so obtained from a windrow into the compressing chamber of the baler where it is compressed to a weight of about 70 pounds and then tied with twine or wire to form a bale. The resulting bales are allowed to fall onto the round at regular intervals. The bales are then picked up from the ground and taken to a suitable storage site for subsequent disposal directly as fodder or for the production of such as chaff or meal at a later date.

In this connection, it will be appreciated that dew which falls on a windrow throughout the night is most essential to ensure that the leaf will not fracture on impact when it comes into contact with the baler mechanism. On the other hand, if a dewfall is too heavy, it may then be necessary to allow the windrow to remain for a period of one or two hours in the sun until the moisture content is once again low enough for picking up and bailing operations. This optimum moisture content condition, however, may well last only for a few hours. Particularly during a spell of hot, 'drying' weather, overnight dewfall may be completely absent and so allow the windrow material to become over-cured before it can be garnered, with the result that the material fractures on impact and produces unsatisfactory bales liable to crumble during handling. As is all too common, little or no dew may settle on windrows for night after night in heatwave conditions and finally a storm will seriously damage the windrowed hay—reducing it to low grade quality or even effectively destroying it completely.

For these reasons, hay baling has been difficult and inefficient. While the art does contain some devices and mechanisms which are intended to maintain proper conditions for hay during such a process, these devices often are not accurate or efficient. Some of these devices may also be extremely costly. For example, some devices do not accurately control the drying process so the exact amount of moisture can be maintained, and cannot be controlled in the event the set amount of moisture is to be changed for some reason.

In fact, since hay may be subjected to varying environmental conditions, such as wet, humid conditions in one case and dry cool conditions in another case, one single treatment process is not likely to satisfy all drying requirements. The single process may be too long in some conditions and too short in others.

Therefore, there is a need for a hay conditioning device which is efficient, reliable and controllable. Still further, there is a need for hay drying mechanism which can set an exact amount of moisture desired, and yet can vary this set amount as required.

Still further, many prior drying machines heat the hay in a manner which causes a loss of color and protein percentage.

OBJECTS OF THE INVENTION

It is a main object of the present invention is to provide a need for a hay conditioning device which is efficient, reliable and controllable.

It is another object of the present invention to provide a need for a hay conditioning device and which is efficient, reliable and controllable.

It is another object of the present invention to provide a need for a hay conditioning device and which is efficient, reliable and controllable, and yet can vary this set amount as required.

It is another object of the present invention to provide a need for a hay conditioning device and which is efficient, reliable and controllable, and yet can vary this set amount as required and which will allow the hay to leave the machine with the same color and protein percentage that it entered with.

SUMMARY OF THE INVENTION

These, and other, objects are achieved by a hay conditioner which includes heating units that use microwave energy to heat hay as it moves on a conveyor belt through the conditioner. The heating units are powered by a generator that is, in turn, connected to a power source in the vehicle being used to tow the hay conditioner. To ensure properly dried and conditioned hay, the hay conditioner includes a unit which senses the humidity of the hay as it moves through the conditioner and which is connected to a control unit that controls the microwave units as well as a control for the conveyor. If the moisture content of the hay is not at a desired level, the humidity sensor adjusts the residence time of the hay or the speed of the conveyor to either speed up the movement of hay past the microwave units or slow down, or even stop, such movement until the hay has the proper moisture content. A temperature sensor also is included so proper environmental temperatures can be assured.

The hay conditioner also includes manual override controls by which an operator can override the automatic control of the drying process under suitable conditions.

In this manner, the hay is conditioned to precisely the moisture content desired yet does not lose color or protein percentage.

BRIEF DESCRIPTION OF THE DRAWING FIGURES

DETAILED DESCRIPTION OF THE PREFERRED EMBODIMENT OF THE INVENTION

Figure 1:
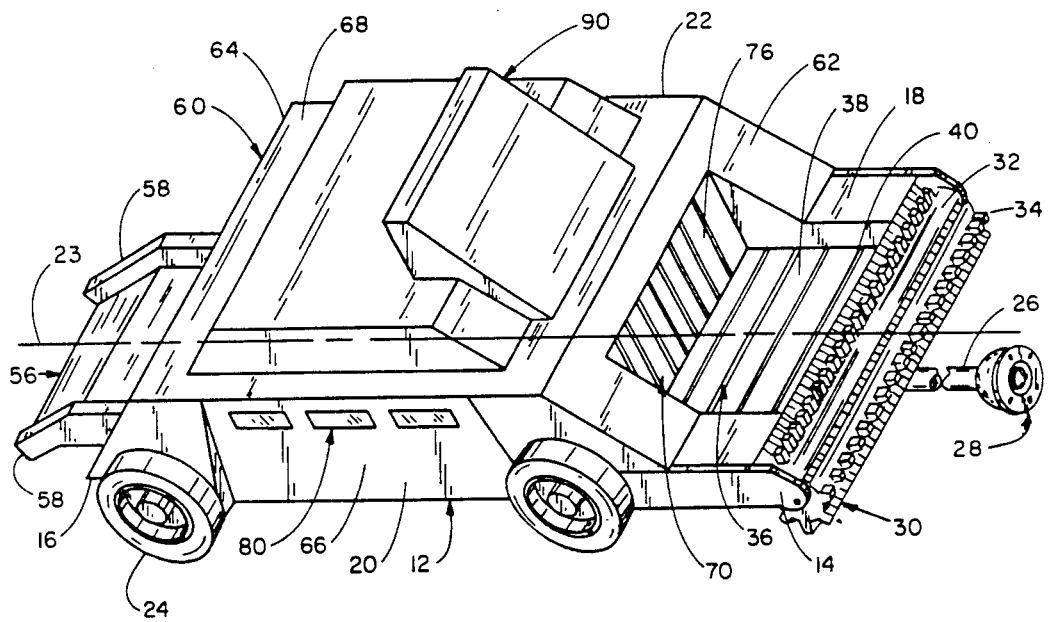
FIG. 1 is a perspective view of a hay conditioner embodying the present invention.

Shown in FIG. 1 is a hay conditioner 10 embodying the present invention. The hay conditioner 10 dries hay as that hay is moved through that conditioner using microwave energy, and ensures that the hay will be properly conditioned as to moisture content and protein percentage.

The hay conditioner 10 includes a chassis 12 which rides over the ground and is pulled by a towing vehicle such as a tractor or the like. The chassis includes a frame having a front end 14, a rear end 16 a top surface 18, and sides 20 and 22. A longitudinal centerline 23 extends from the chassis forward end to the chassis rear end. A plurality of wheels, such as wheel 24 are mounted on the chassis so the chassis can be pulled over rough and uneven terrain. The chassis is connected to a towing vehicle (not shown) by a towing bar 26 extending forwardly of the chassis from the front end thereof. A power take-off unit 28 is located on the front end of the towing bar and connects to appropriate equipment in the towing vehicle to transfer power from that towing vehicle to the hay conditioner 10.

The conditioner 10 further includes a hay pickup unit 30 on the chassis front end for picking up hay from the ground and moving that hay into the conditioner. the hay pickup unit 30 includes a central hub 32 rotatably mounted on the chassis by appropriate axles, bearings and the like. A motor (not shown) can be mounted on the chassis and connected to the central hub to rotated that hub in a direction which will pick up hay from the ground over which the hay conditioner is moving and lift that hay to the top surface of the chassis. A motor may not be needed in all situations, but if necessary, such motor will be connected to the vehicle source of power via the power take-off unit 28 and will be controlled by the vehicle operator. A multiplicity of raking tines, such as tine 34, are mounted on the central hub to engage the hay that is being lifted onto the chassis.

A conveyor unit 36 is mounted on top of the chassis to move hay received from the pickup unit through the hay conditioner. The conveyor unit includes a conveyor belt 38 which extends along the longitudinal centerline of the chassis from adjacent to the front end of the chassis to adjacent to the rear end of the chassis, and which includes an inlet end 40 and an outlet end 42 (best shown in FIG. 2) adjacent to a belt drive means 44. The belt drive means includes a motor 48 electrically powered via the power take-off unit and drivingly connected to a drive belt 50 which is drivingly connected to the conveyor belt via a gear and drive roller system which includes a drive roller 52 and idler and guide rollers, such as rollers 54. The drive means drives the belt in directions indicated at 55 and 55' in FIG. 2. An outlet chute 56 is mounted on the chassis rear end and is positioned adjacent to the belt outlet end 42 to receive hay therefrom. The outlet chute is positioned and shaped to drop conditioned hay onto the ground behind the chassis as that chassis moves. The outlet chute has suitable guide edges 58 which guide the conditioned hay off of the chassis onto the ground.

A housing 60 is located on top of the chassis, and includes a first end 62 located near the conveyor inlet end 40, a second end 64 located near the conveyor outlet end 42, sides, such as side 66, located adjacent to the chassis sides, and a top 68 supported by those sides and ends to be positioned above the chassis top surface 18. An inlet door 70 is located on housing end 62 and receives the hay to be conditioned, while an outlet door 72 is located on housing end 64 and delivers the conditioned hay to the outlet chute. Each door includes a cover element, such as cover element 76 on the door 70, which covers the door in a manner which permits hay to enter but which closes the housing. The doors preferably include strips of flexible material, such as is used on drive thorough car washes. These strips are pendently supported from the top of the housing and have lower ends which just touch the conveyor belt, and are otherwise unsupported.

A plurality of windows, such as window 80, are located in the housing sides whereby the condition of the hay in the housing can be visually observed.

Figure 3:
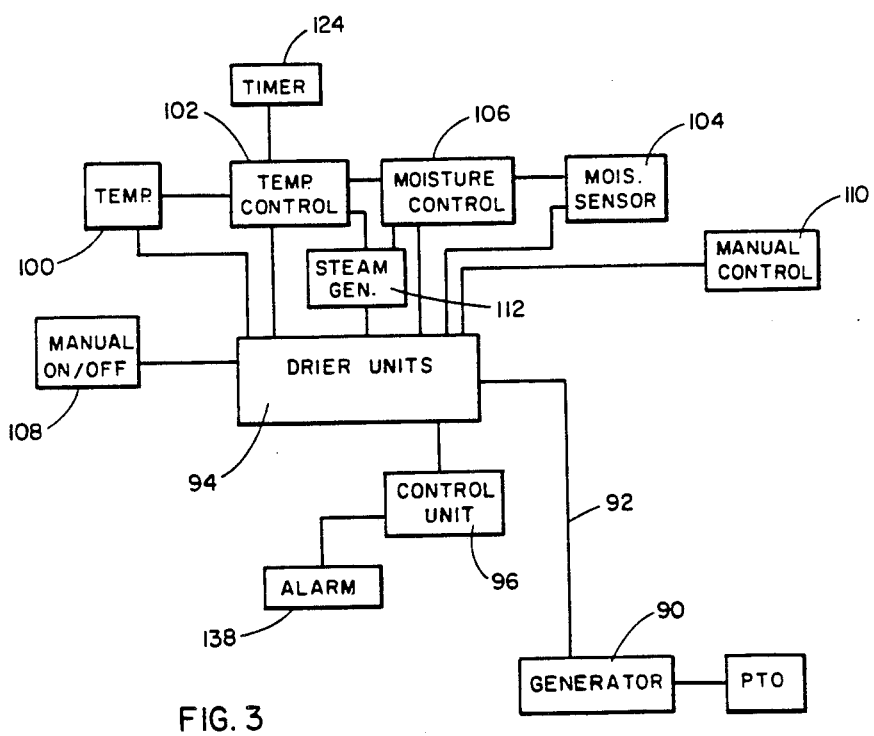
FIG. 3 is a block diagram illustrating the controls and the drier units of the hay conditioner.
Figure 2:
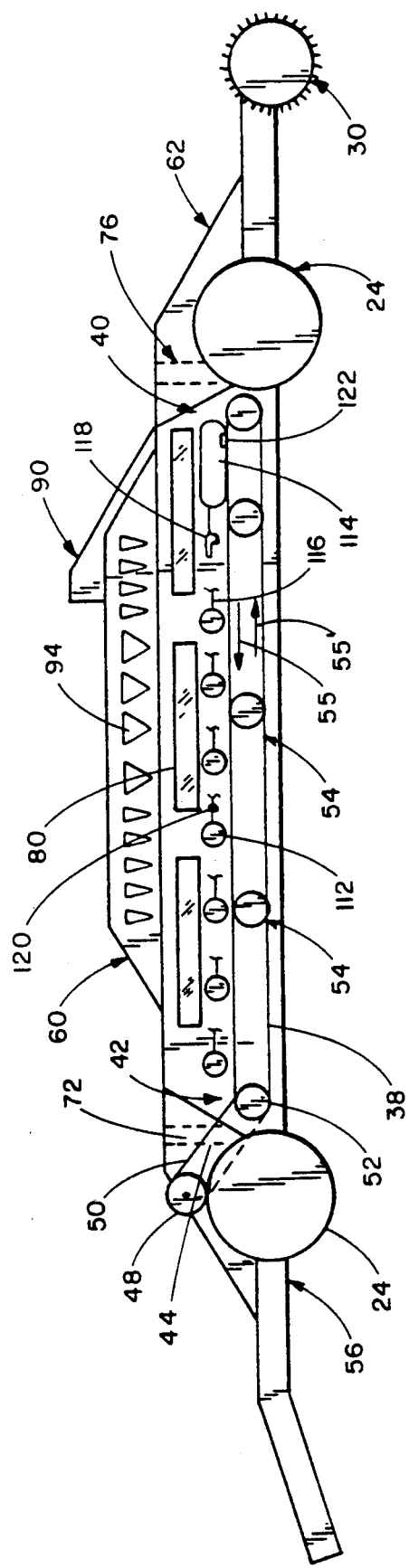
FIG. 2 is a cutaway side elevational view of the hay conditioner of the present invention.

As is best shown in FIGS. 2 and 3, the conditioner 10 includes a hay conditioning unit located inside the housing 60. This conditioning unit dries the hay and ensures that the hay has the proper moisture and protein content when that hay is dispensed from the chassis via the outlet chute. The conditioning unit includes a power source 90 that is driven from the power take-off unit and is electrically connected to each element of the unit by suitable line conductors, such as line conductor 92. In the interest of simplicity of illustration, only line conductor 92 is shown; however, those skilled in the art will understand how to electrically connect the other elements of the hay conditioning unit to the power source.

Figure 4:
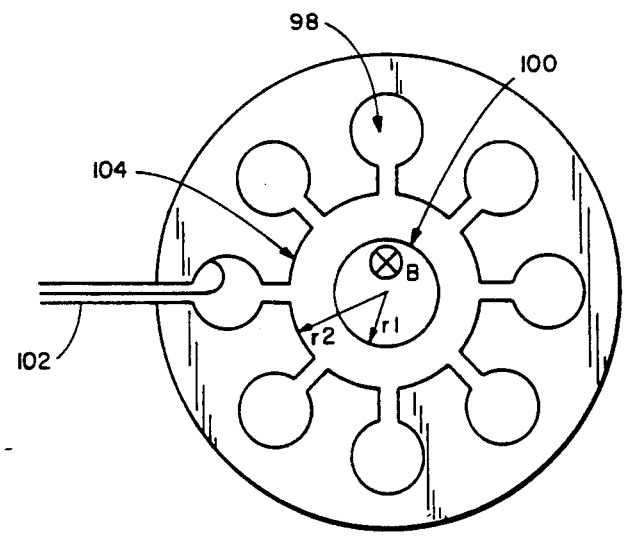
FIG. 4 illustrates a cylindrical magnetron used in the drier units of the hay conditioner of the present invention whereby microwave energy is used to dry and condition the hay as that hay moves through the hay conditioner.

The hay conditioning unit includes a multiplicity of energy generating units, such as unit 94, which use microwave energy to dry the hay as that hay moves through the housing. These units can be of various forms, but preferably include a magnetron oscillator 96, such as illustrated in FIG. 4. Magnetron oscillators are capable of generating high peak RF pulses, such as 40 MW at 10 GHz with a 50 Kv DC voltage. The average power outputs are as much as 300 W at X-band, and the DC-to-RF conversion efficiency ranges from 40 to 70 %. As shown in FIG. 4, the basic magnetron includes a number of identical resonators arranged in a cylindrical pattern as shown in FIG. 4. As in other microwave tubes, part of the energy in the magnetron gained by an electron accelerated by a DC electrical potential is converted into RF energy. The DC and RF potentials acts on the electrons simultaneously in the interactive space of the magnetron. A magnetic field perpendicular to the electric field is developed and controlled by a control unit 96. The magnetron can be tuned by introducing additional metallic parts that interfere with the electric or magnetic field of the cavities. The AC power may be coupled out from one of the cavities by a coaxial line or loop or by means of a waveguide. As shown in FIG. 4, the magnetron includes an anode cavity 98, a cathode 100, an output 102 and an anode pole 104.

As was discussed above, it is desirable for the hay to be conditioned to a specific value of moisture content. However, as was also mentioned above, varying environmental conditions may make achieving this object difficult and unpredictable. Therefore, the conditioning unit of the present invention includes means for customizing the conditioning process to the specific conditions extant at the time of the process. In this manner, a wet, humid environmental condition can be accounted for as easily as can a dry environmental condition. The process is simply adjusted to account for more or less moisture in the hay as it enters the housing.

This means includes temperature sensor 100 located at various positions along the conveyor belt to sense temperature at such positions and feed signals associated with such temperature measurements to a temperature control unit 102 which is connected to the main control unit 96. If temperature at any location is out of range, a signal is sent to the main control unit, and such unit changes the power to the drier units, or changes the speed of the conveyor belt so that all temperatures along the path followed by the hay as it moves through the housing remain within predetermined temperature ranges. The preset ranges are selected so that the hay always exits the housing at a desired temperature. The temperature is one measure of the moisture content of the hay, and thus is used in the overall control process. The control unit 96 also includes feedback loops so that proper control can be effected.

The unit 10 further includes moisture sensors 104 located at various positions along the conveyor belt to sense the moisture content of the hay as it moves through the housing. The moisture content sensed at each location is translated into a signal by a moisture control unit 106, and this signal is sent to the main control unit 96. The moisture content signal is also sent to the temperature sensor so these two state conditions can be used in conjunction with each other to determine the exact condition of the hay at each location along the path. The main control unit 96 processes such signals to determine if each signal, or each combination signal, is within a preset range. If a signal is out of this preset range, the control unit alters the speed of the conveyor belt, alters the power to the drier units or the like until the moisture contents sensed at each location along the path are within the preset ranges. Again, a feedback loop for moisture control is included in the control unit 96. The main control unit 96 includes various microprocessors which are programmed for certain moisture contents and certain temperature ranges and for certain combinations of these two state conditions.

In certain circumstances, a vehicle operator may want to override the automatic process control of the unit 10. For this purpose, the unit 10 includes manual override on/off switch 108 by which the entire unit can be shutdown, and manual control 110 by which the movement of the conveyor belt or the power to the drier units can be varied manually. These two manual controls can be located inside the towing vehicle, and will permit a vehicle operator to carry out any of the functions discussed in the present disclosure for controlling the conditions of the product as it moves through the housing.

As a further insurance to establishing proper conditions for the conditioning process, the unit 10 includes a plurality of steam generators, such as steam generator 112, located along the path of the conveyor belt. These steam generators are controlled by the main control unit 96 according to the temperatures and moisture contents of the hay along the path through the housing. If the product is too dry, even after the conveyor belt speed has been adjusted, the control unit 96 can send a signal to the steam generator closest to the temperature or moisture sensor identifying the dry condition, and inject steam into the housing. Each steam generator is connected to a water source 114 via a header pipe 116 and a pump 118 which is controlled by the main control unit 96 and is powered by the generator 90. Each steam generator has a control valve 120 associated therewith and which is connected to the main control unit 96 to turn on each individual steam generator. Each control valve will have a by-pass setting so the steam can be sent to various steam generators while by-passing others. The source 114 includes a heater 122 so the water therein will be maintained at a desired temperature. This heater 122 is connected to the main control unit 96 and to the generator 90.

The unit 10 further includes a timer mechanism 124 connected to the main control unit 96 and to the conveyor belt. This timer mechanism is set to delay the movement of the belt for a preset time period to permit the temperature of moisture of the product to be altered by the above-discussed elements of the unit. This timer mechanism has the delay period which can be adjusted each time the unit is used. Thus, the delay period can be set to be longer for certain environmental conditions or shorter for others as the situation demands. In this manner, the exact environmental conditions can be accounted for in the control process.

Figure 5:
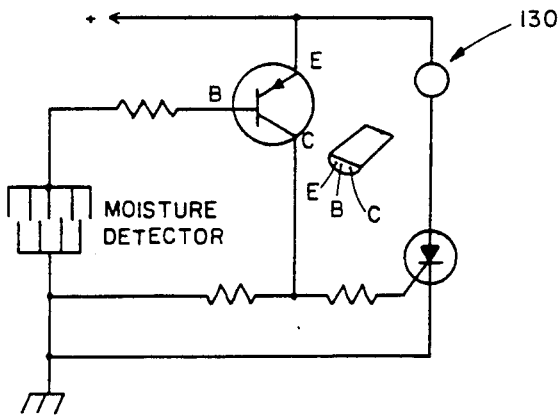
FIG. 5 is a schematic illustration of a moisture sensor circuit used to detect the moisture content of the hay as that hay moves through the hay conditioner.

By way of example, a suitable moisture detector 130 is shown in FIG. 5. The detector is made of fine wires spaced about one to two inches apart. When the area between a pair of wires becomes moistened with a predetermined amount of water, a signal is sent to the main control unit. The main control unit includes a circuit which is set to react according to whether there is sufficient moisture present or too much moisture present.

Figure 6:
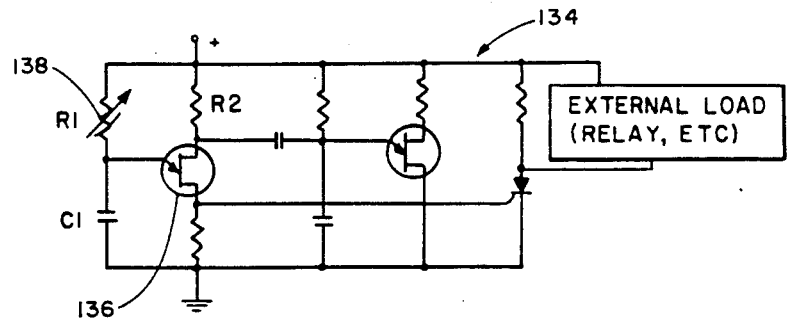
FIG. 6 is a schematic illustration of a time delay circuit that can be used to control the residence time of hay in the drier units of the hay conditioner.

A suitable time delay circuit 134 is shown in FIG. 6. The timing interval is initiated by a signal which causes power to be applied to the circuit. At the end of the timing interval, which is determined by the value of R-1C1, the transistor 136 fires the controlled rectifier. This places the supply voltage minus about one volt across the load. Load currents are limited only by the rating of the controlled rectifier. A calibrated potentiometer 138 is used to permit setting a predetermined time delay after one initial calibration.

The unit 10 further includes an alarm signal 138 located in the towing vehicle. This alarm signal is connected to the main control unit 96 and is activated when the main control unit is unable to adjust process conditions to bring the state conditions of the product into one or more of the preset ranges. In such a situation, the vehicle operator can make a decision to override the automatic process control or to make certain adjustments in the preset ranges.

It is understood that while certain forms of the present invention have been illustrated and described herein, it is not to be limited to the specific forms or arrangements of parts described and shown.

I claim:

1. A hay conditioner comprising:
A) a chassis having a forward end and a rear end, sides connecting said forward end to said rear end, a top surface, a towing bar element connected to said forward end and having a towing vehicle attaching element thereon;
B) a plurality of wheels rotatably mounted on said chassis;
C) a power take-off unit connected to a vehicle which is towing said chassis;
D) an electrical generator mounted on said chassis and connected to said power take-off unit;
E) a hay pickup unit mounted on said chassis front end and including (1) a central hub rotatably mounted on said chassis,
(2) raking tines mounted on said central hub in position to contact hay located on the ground over which said chassis moves, and
(3) means for rotating said central hub in a direction to throw hay from the ground onto said chassis top surface;
F) a conveyor unit mounted on said chassis and which includes
(1) a conveyor belt extending along the chassis from adjacent to said chassis front end to adjacent to said chassis rear end,
(2) an inlet end located near said chassis front end,
(3) an outlet end located near said chassis rear end, and
(4) conveyor belt drive means for moving said conveyor belt from said inlet end to said outlet end;
G) a housing mounted on said chassis top surface adjacent to said conveyor belt and including
(1) a first end located near said conveyor unit inlet end,
(2) a second end located near said conveyor unit outlet end,
(3) sides located near said chassis sides,
(4) a top connected to said sides, and
(5) windows defined through said housing sides;
H) a hay conditioning unit mounted on said housing and including
(1) a plurality of drying units mounted in said housing, each of said drying units including a magnetron oscillator,
(2) a power source connected to said generator and to each drying unit,
(3) a control unit connected to said power source and to said hay conditioning power unit,
(4) a manual on/off switch connected to said hay conditioning control unit,
(5) a temperature sensor element mounted in said housing adjacent to said conveyor belt and connected to said hay conditioning control unit, said hay conditioning control unit including circuit means connected to said conveyor belt drive means to control the speed with which said conveyor belt moves through said housing according to temperature conditions in said housing,
(6) a humidity sensor mounted in said housing adjacent to said conveyor belt and connected to said hay conditioning control unit, said hay conditioning control unit including further circuit means connected to said conveyor belt drive means to control the speed with which said conveyor belt moves through said housing according to moisture conditions in said housing,
(7) a manual control connected to each of said drier units, and
(8) timer mechanism connected to said control unit and to said humidity sensor element and to said temperature sensor element.

2. The hay conditioner defined in claim 1 wherein said humidity sensor includes a moisture detector.

3. The hay conditioner defined in claim 2 wherein said moisture detector includes a transistor.

4. The hay conditioner defined in claim 3 wherein said timer mechanism includes a calibrated potentiometer.

5. The hay conditioner defined in claim 4 further including an outlet chute on said chassis rear end.

6. The hay conditioner defined in claim 5 further including a temperature control system on said housing adjacent to said conveyor belt.

7. The hay conditioner defined in claim 6 wherein said temperature control system includes a plurality of temperature sensors located adjacent to said conveyor belt at spaced apart positions.

8. The hay conditioner defined in claim 7 further including a plurality of steam generators in said housing adjacent to said conveyor belt.

9. The hay conditioner defined in claim 8 further including an alarm circuit means connected to said hay conditioning unit control unit.

10. The hay conditioner defined in claim 9 further including manual override switches connected to said hay conditioning unit drier units.

* * * * *